(12) United States Patent
Ishii et al.

(10) Patent No.: US 9,156,400 B2
(45) Date of Patent: Oct. 13, 2015

(54) STEERING WHEEL

(71) Applicant: TOYODA GOSEI CO., LTD., Kiyosu-shi, Aichi-ken (JP)

(72) Inventors: Tsutomu Ishii, Kiyosu (JP); Mikine Hayashi, Kiyosu (JP); Osamu Hirose, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/454,809

(22) Filed: Aug. 8, 2014

(65) Prior Publication Data
US 2015/0042079 A1 Feb. 12, 2015

(30) Foreign Application Priority Data

Aug. 12, 2013 (JP) .................. 2013-167697

(51) Int. Cl.
*B60Q 5/00* (2006.01)
*B60R 21/203* (2006.01)
*B60R 21/2165* (2011.01)

(52) U.S. Cl.
CPC ............ *B60Q 5/003* (2013.01); *B60R 21/2037* (2013.01); *B60R 21/21658* (2013.01)

(58) Field of Classification Search
CPC .............. B60Q 5/003; B60R 21/2037; B60R 21/21658
USPC ................... 200/61.54, 61.55; 280/728.2, 731
See application file for complete search history.

(56) References Cited

U.S. PATENT DOCUMENTS

| 6,719,324 | B2* | 4/2004 | Albers et al. ................... 280/731 |
| 8,256,797 | B2* | 9/2012 | Sakurai et al. ................. 280/731 |
| 8,342,567 | B2* | 1/2013 | Sasaki et al. ................. 280/728.2 |
| 8,459,686 | B2* | 6/2013 | Suzuki et al. .............. 280/728.2 |
| 8,500,156 | B2* | 8/2013 | Banno et al. ................. 280/728.2 |
| 8,556,292 | B2* | 10/2013 | Umemura et al. ............ 280/731 |
| 8,794,662 | B2* | 8/2014 | Ishii et al. ...................... 280/731 |
| 2010/0219621 | A1 | 9/2010 | Sasaki et al. |
| 2012/0169032 | A1 | 7/2012 | Sasaki et al. |
| 2013/0076011 | A1 | 3/2013 | Umemura et al. |

FOREIGN PATENT DOCUMENTS

| JP | 2010-201949 A | 9/2010 |
| JP | 2010-202085 A | 9/2010 |
| JP | 2011-046352 A | 3/2011 |
| JP | 2013-071626 A | 4/2013 |

* cited by examiner

*Primary Examiner* — Laura Freedman
(74) *Attorney, Agent, or Firm* — Posz Law Group, PLC

(57) ABSTRACT

A steering wheel has an airbag apparatus mounted on a core metal via a horn switch mechanism for activating a horn device. The horn switch mechanism includes a supporting member that is formed of an electrically conductive material, supported on the core metal, and extends rearward, a slider that is formed of an insulating resin material, is disposed outside the supporting member to be slidable with respect to the supporting member, and urged rearward by an urging member, a cap member that is formed of an insulating resin material and covers at least a rear end of each of the supporting member and the slider, and a movable side contact that is formed of an electrically conductive metal material and disposed between the cap member and the slider. The horn switch mechanism is configured to activate the horn device.

6 Claims, 8 Drawing Sheets

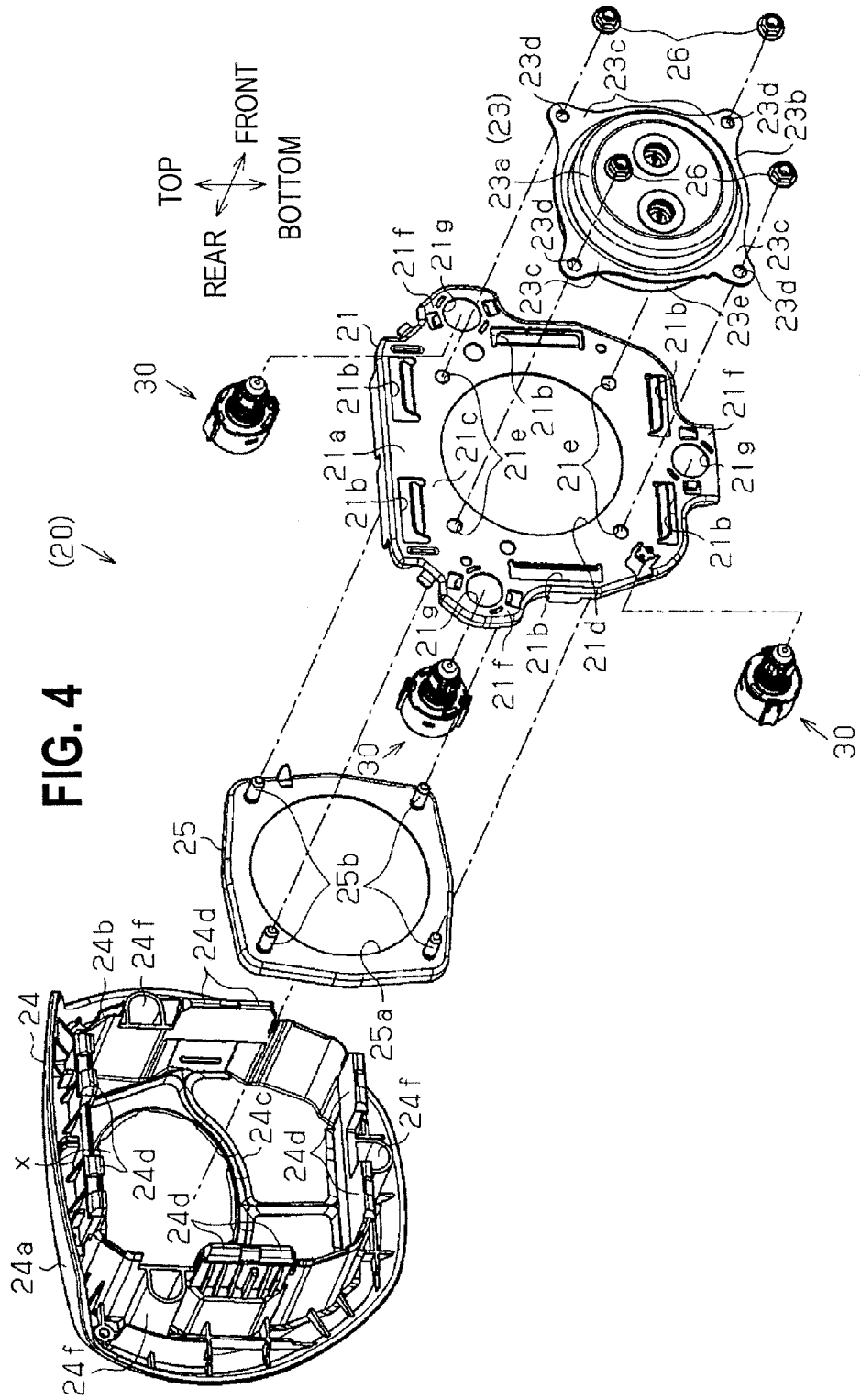

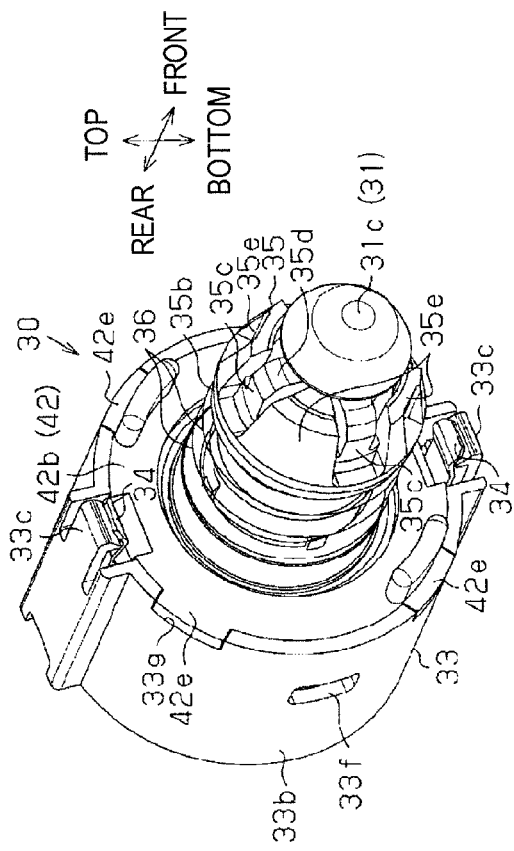
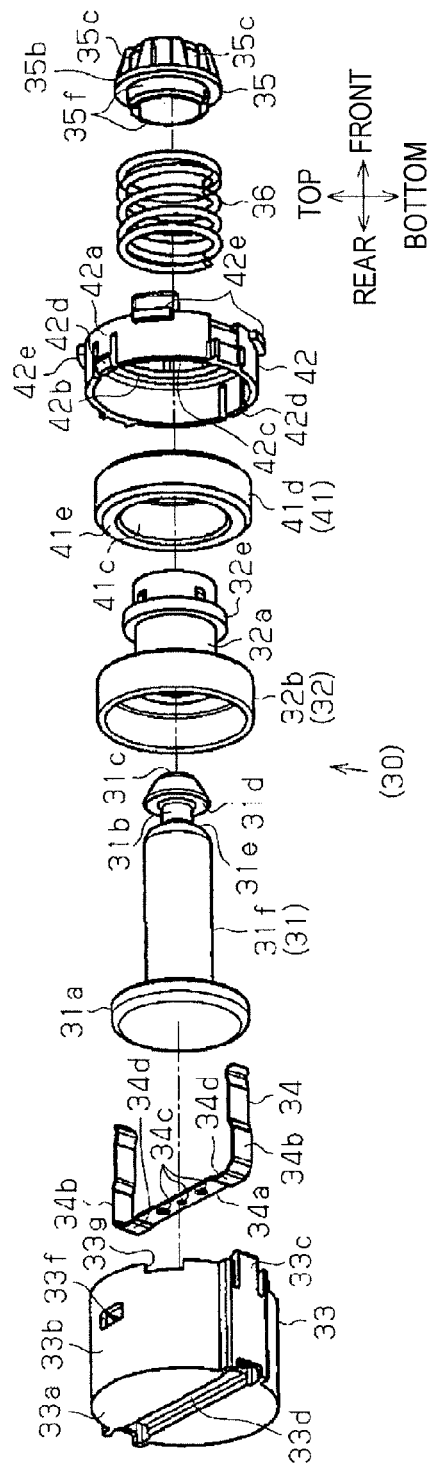
FIG. 5A
FIG. 5B

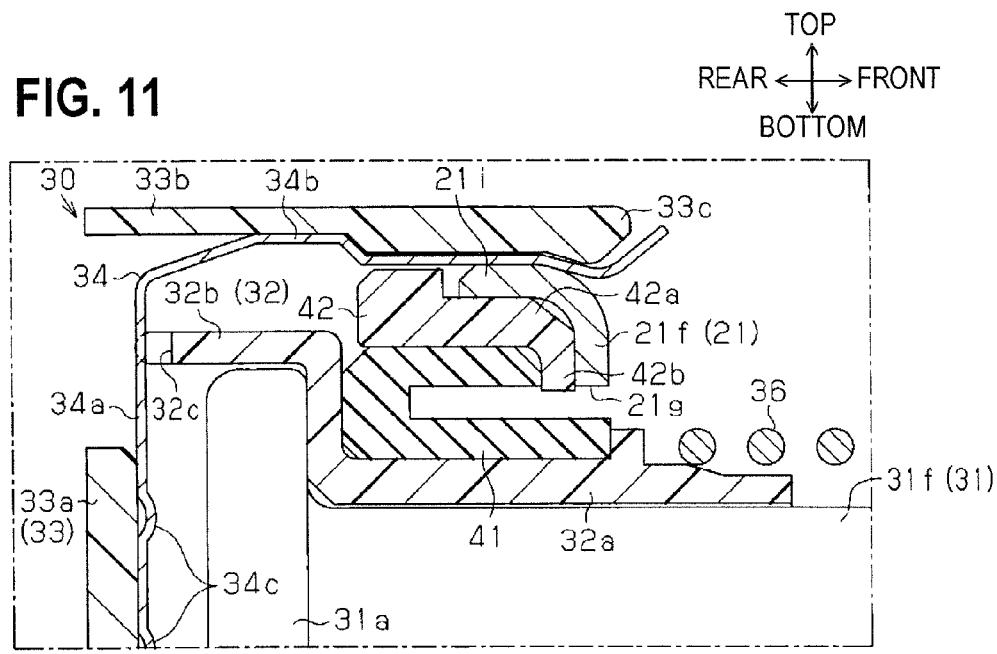
FIG. 11
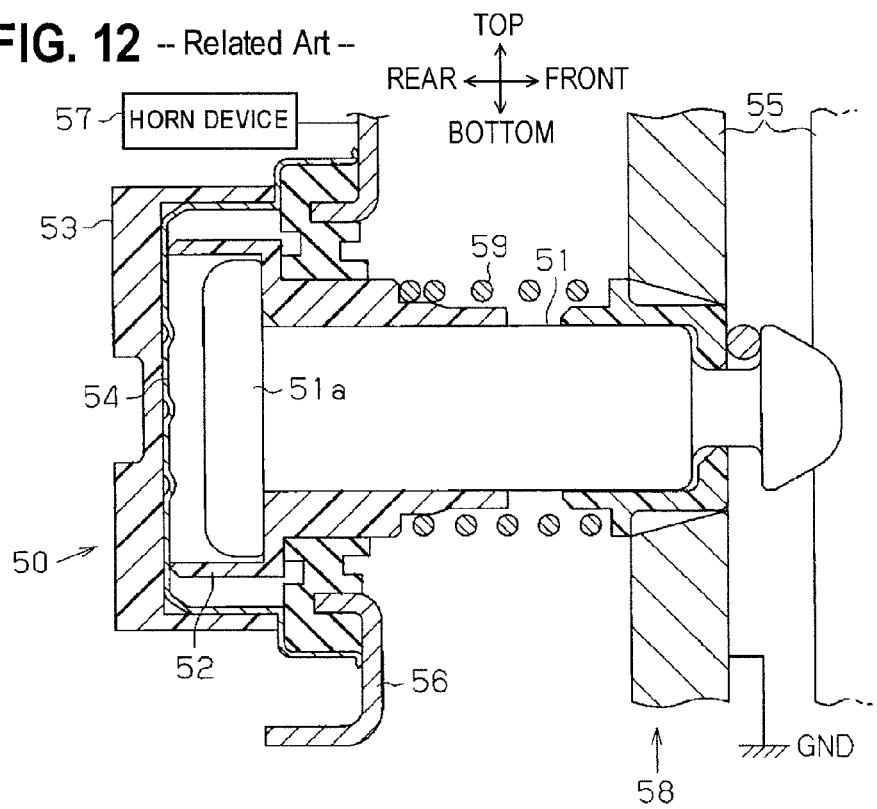
FIG. 12 -- Related Art --

STEERING WHEEL

CROSS-REFERENCE TO RELATED APPLICATIONS

This application claims the benefit of Japanese Patent Application No. 2013-167697 (filed on Aug. 12, 2013), the entire contents of which are hereby incorporated by reference.

BACKGROUND

1. Technical Field

The present invention relates to a steering wheel, in which when an impact is exerted on conveyances, such as vehicles, from the front thereof, an airbag apparatus for protecting a driver from the impact is provided.

2. Related Art

One aspect of steering wheels of such a type is for example known, in which an airbag apparatus is mounted on a core metal via a horn switch mechanism for activating a horn device as described in JP-A-2013-71626.

As shown in FIG. 12, the horn switch mechanism 50 includes a supporting member 51, a slider 52, a cap member 53 and a movable side contact 54. The supporting member 51, which is formed of an electrically conductive metal material, is locked on the core metal 55 and extends rearward. A rear end of the supporting member 51 constitutes a fixed contact 51a. The slider 52, which is formed of an insulating resin material, is slidably disposed outside the supporting member 51 and urged rearward by a spring 59. The cap member 53 is formed of an insulating resin material and covers a rear end of each of the supporting member 51 and the slider 52. The movable side contact 54 is formed of an electrically conductive metal material and disposed between the cap member 53 and the slider 54. The movable side contact 54 is electrically contacted to the horn device 57 via a bag holder 56 and the like.

In the steering wheel 58 provided with the horn switch mechanism 50, when the airbag apparatus is not pressed down, the movable side contact 54 is located rearward apart from of the fixed contact 51a of the supporting member 51. Thus, electrical communication between both contacts 51a and 54 is interrupted and thus the horn device 57 is not activated.

Contrary, when the airbag apparatus is pressed down, a force exerted on the airbag apparatus is transferred to the movable side contact 54 and the slider 52 via the cap member 53. The slider 52 is pressed by the cap member 53 and the slider 52 is slid forward against the spring 59. Also, when the movable side contact 54, together with the cap member 53, is moved forward to be contacted and electrically communicated with the fixed contact 51a of the supporting member 51, the horn device 57 is activated.

Thus, in addition to exhibiting a function of being locked on the core metal 55 and a function of supporting the airbag apparatus to be movable relative to the core metal 55 in a front and rear direction, the supporting member 51 also serves as the fixed contact 51a. Therefore, the number of components in the steering wheel can be reduced, thereby obtaining simplification of the configurations thereof.

However, according to JP-A-2013-71626, a configuration in which the slider 52 is indirectly contacted with the cap member 53 via the movable side contact 54 is employed. Therefore, when the slider 52 made of resin is brushed against the movable side contact 54 made of metal, a part of the slider 52 contacted with the movable side contact 54 is cut to generate resin powders. Also, if resin powders are accumulated and thus an insulating layer is formed between the movable side contact 54 and the fixed contact 51a, there is a risk that, when the airbag apparatus is pressed down, electrical communication between the movable side contact 54 and the supporting member 51 is disturbed.

Accordingly, the present invention has been made keeping in mind the above problems, and an object thereof is to provide a steering wheel in which generation of resin powders due to contact of a slider with a movable side contact can be prevented.

SUMMARY (1) According to an aspect of the invention, a steering wheel has an airbag apparatus mounted on a core metal via a horn switch mechanism for activating a horn device. The horn switch mechanism includes a supporting member that is formed of an electrically conductive material, supported on the core metal, and extends rearward, a slider that is formed of an insulating resin material, is disposed outside the supporting member to be slidable with respect to the supporting member, and urged rearward by an urging member, a cap member that is formed of an insulating resin material and covers at least a rear end of each of the supporting member and the slider, and a movable side contact that is formed of an electrically conductive metal material and disposed between the cap member and the slider. The horn switch mechanism is configured to activate the horn device by transferring a force which is exerted onto the airbag apparatus when the airbag apparatus is pressed down to the movable side contact and the slider via the cap member, sliding the slider forward against the urging member, and moving the movable side contact forward to be contacted with the supporting member. On at least one of a region of the movable side contact located rearward of a rear end of the slider, and a region of the rear end of the slider located forward of the movable side contact, a spacing portion for spacing the movable side contact and the rear end of the slider from each other is provided.

According to the above configuration (1), when the airbag apparatus is not pressed down, the movable side contact is located rearward apart from the supporting member so that electrical communication between both is interrupted and thus the horn device is not activated. At this time, the movable side contact and the rear end of the slider are spaced from each other by the spacing portion. The cap member is in contact with the rear end surface of the slide in a region, which is located rearward of the rear end of the slider but not rearward of the movable side contact.

When the airbag apparatus is pressed down from the above state, a force exerted on the airbag apparatus is transferred to the movable side contact and the slider via the cap member. The slider is pressed by the cap member and the slider is slid forward against the urging member. Also, when the movable side contact, together with the cap member, is moved forward to be contacted and electrically communicated with the supporting member, the horn device is activated. Even in this case, similarly to the above case, the movable side contact and the rear end of the slider are spaced from each other by the spacing portion.

Thus, the slide is spaced from the movable side contact, regardless of whether or not the horn device is activated. Therefore, because the slider made of resin is not brushed against the movable side contact made of metal, there is hardly a phenomenon that a part of the slider, which would otherwise be contacted with the movable side contact, is cut to generate resin powders.

(2) In the steering wheel according the configuration (1), the movable side contact is formed of a plate material, and the spacing portion is formed by rearward bending a region of the plate material located rearward of the rear end of the slider.

According to the above configuration (2), by rearward bending a region of the movable side contact made of the plate material, which is located rearward of the rear end of the slider, the spacing portion for spacing the movable side contact and the rear end from each other is formed in the region of the movable side contact. Because the movable side contact having the spacing portion is employed and thus the movable side contact is spaced from the rear end of the slider, there is hardly the phenomenon that the slider is cut to generate resin powders.

(3) In the steering wheel according to the configuration (2), the supporting member includes a collar portion at a rear end thereof, the rear end of the slider has a cylinder shape and surrounds the collar portion, and a part of the movable side contact is constituted by a main body having a band shape extending in a radial direction of the cap member and having the spacing portion formed in the region located rearward of the rear end of the slider.

According to the above configuration, the spacing portion provided in the region of the body of the movable side contact, which is located rearward of the rear end of the slider, is spaced rearward from the rear end surface of the rear end. The cap member is in contact with the rear end surface of the rear end in a region, which is located rearward of the rear end of the slider but not rearward of the body. At this time, because the body has a band shape, a region which is located rearward of the rear end of the slider and also rearward of the body is not large. Therefore, the cap member is in contact with a substantial portion of the rear end surface of the rear end. As a result, when the airbag apparatus is pressed down, a force exerted on the airbag apparatus is transferred to the slider through a large area of the rear end surface of the rear end.

(4) In the steering wheel according to any one of the configurations (1) to (3), the slider and the airbag apparatus are connected with each other by an elastic member disposed therebetween.

According to the above configuration, the airbag apparatus serves as a damper mass of a dynamic damper and the elastic member serves as a spring of the dynamic damper. Therefore, if the steering wheel is vibrated at a certain frequency, the elastic member, together with the airbag apparatus, is vibrated at a resonant frequency equal to or near the frequency while being elastically deformed, so that vibration energy of the steering wheel is absorbed. Due to such absorption, a vibration of the steering wheel is suppressed.

According to the steering wheel, generation of resin powders due to contact of the slider with the movable side contact can be prevented.

BRIEF DESCRIPTION OF THE DRAWINGS

FIGS. 1A and 1B are views showing an embodiment of a steering wheel, in which FIG. 1A is a side view of the steering wheel and FIG. 1B is a view of FIG. 1A as viewed in a direction of an arrow A.

FIG. 4 is an exploded perspective view showing the airbag apparatus of FIG. 3.

FIG. 5A is a perspective view showing a horn switch mechanism and the like according to the embodiment and FIG. 5B is an exploded perspective view of FIG. 5A.

FIG. 11 is a partial sectional view showing a variant of a spacing portion in the hone switch mechanism.

FIG. 12 is a partial sectional view showing interior structures of a horn switch mechanism and the like in a conventional steering wheel.

DETAILED DESCRIPTION

Figure 1A:
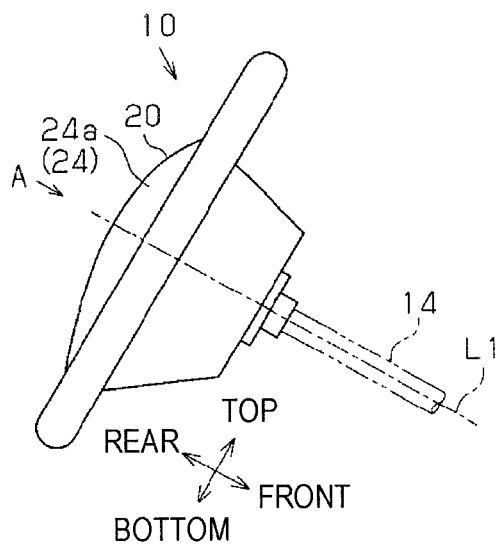

Embodiments of a steering wheel will be now described with reference to FIGS. 1 to 10. As shown in FIG. 1A, a vehicle has a steering shaft 14, which extends in a front and rear direction along an axis L1 and rotates about the axis L1, inclinedly arranged therein to rise upward as it goes toward a rear side thereof. A steering wheel 10 is attached to a rear end of the steering shaft 14.

Meanwhile, in the present embodiment, each component of the steering wheel 10 will be described based on the axis L1 of the steering shaft 14. A direction along the axis L1 is referred to as the "front and rear direction" of the steering wheel 10, and among directions along a plane perpendicular to the axis L1, a direction in which the steering wheel 10 is erected is referred to as a "upward and downward direction". Accordingly, the front and rear direction and the upward and downward direction of the steering wheel 10 are slightly inclined with respect to a front and rear direction (horizontal direction) and an upward and downward direction (vertical direction) of the vehicle.

In addition, FIGS. 3, 5B, 7 to 9, 10A and 10B is shown in a state where, for convenience, the front and rear direction of the steering wheel 10 conforms to the horizontal direction and the upward and downward direction of the steering wheel 10 conforms to the vertical direction. FIGS. 11 and 12 are also shown in the same manner.

Figure 1B:
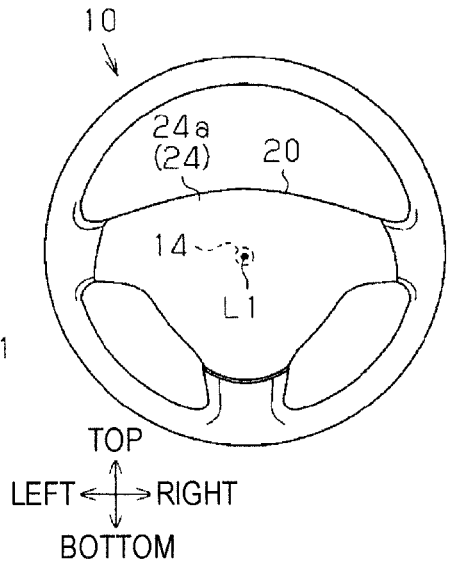
Figure 2:
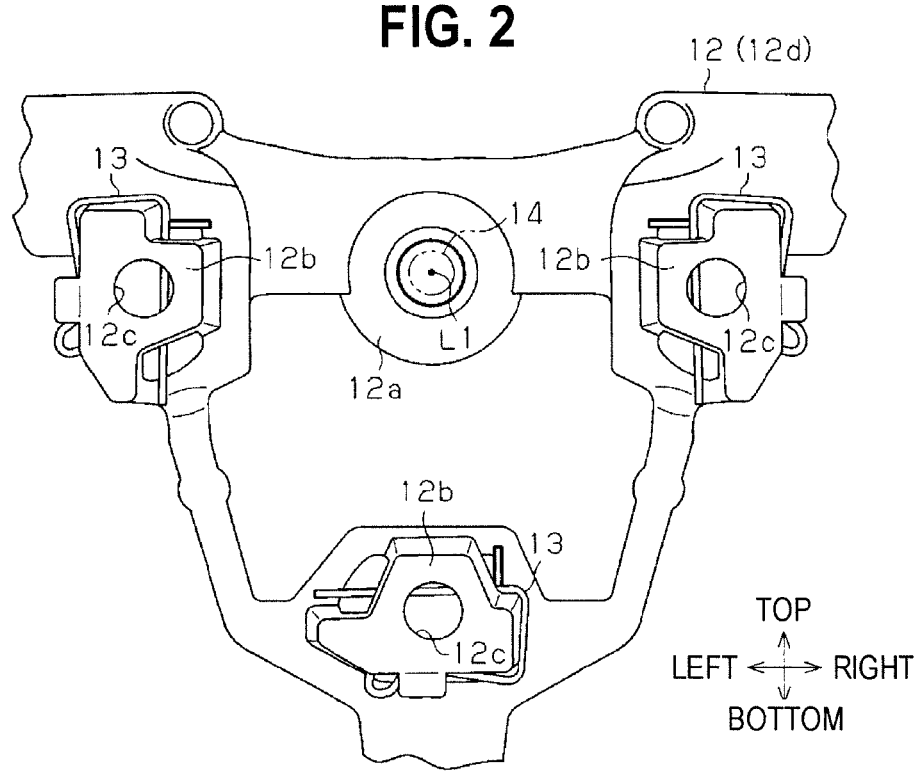
FIG. 2 is a partial front view showing a core metal of the steering wheel in FIG. 1B.

As shown in FIG. 1B, the steering wheel 10 has an airbag apparatus (airbag module) 20 on the center part thereof. A frame section of the steering wheel 10 is constituted by a core metal 12. FIG. 2 shows a part of the core metal 12. The core metal is formed of iron, aluminum, magnesium, alloys thereof or the like. The core metal 12 is attached to the steering shaft 14 on a boss portion 12a thereof, which is located on the center part thereof, and integrally rotated with the steering shaft 14.

Figure 7:
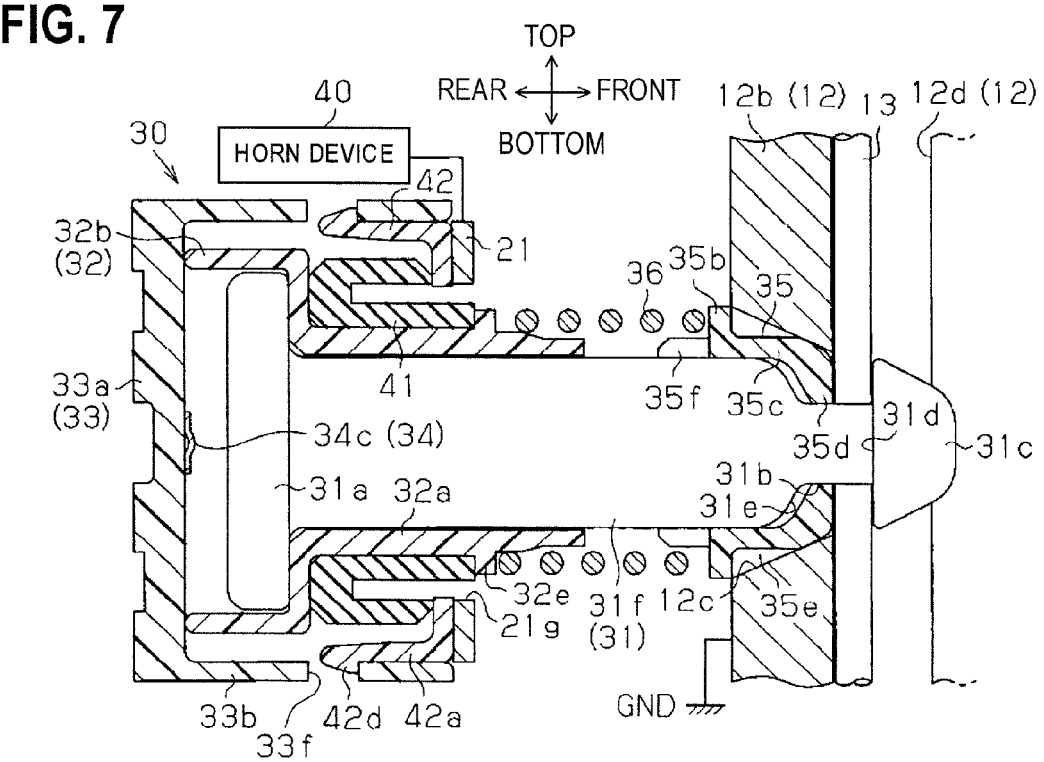
FIG. 7 is a partial sectional view showing interior structures of the hone switch mechanism and the like, as taken along a line 7-7 in FIG. 6.

In the core metal 12, retainer portions 12b each having a through-hole 12c are provided on a plurality of locations around the boss portion 12a. Also, if the retainer portions 12a and the other portion need to be distinguished from each other, the latter portion is referred to as a core metal main body 12d. As shown in FIG. 7, an inside wall surface of each through-hole 12c has a tapered shape in which a diameter thereof is increased as it goes toward the rear side. Meanwhile, the inside wall surfaces having such a tapered shape are omitted in FIG. 2.

As shown in FIGS. 2 and 7, clips 13 are respectively incorporated between each retainer portion 12b and the core metal main body 12d in the vicinity of the through-hole 12c. Each clip 13 is formed by bending a wire material, which is made of an electrically conductive metal, such as spring steel, in a predetermined shape. Each clip 13 is incorporated between the retainer portion 12b and the core metal main body 12d in a slightly elastically deformed state, and thus is retained in the core metal 12. A part of the clip 13, for example an end thereof, is in contact with at least one of the retainer portion 12b and the core metal main body 12d. A part of each clip 13 is located near the forward of the through-hole 12c.

The vehicle is provided with a horn device 40, and a plurality of horn switch mechanisms 30 for operating the horn device are respectively mounted on each retainer portion 12b of the core metal 12 in a snap-fit structure. Each horn switch mechanism 30 has the same configuration. In addition, the airbag apparatus 20 is supported on the core metal 12 via the horn switch mechanisms 30. In this way, each horn switch mechanism 30 has both a function of supporting the airbag apparatus 20 and a function as a horn switch.

Also, according to the present embodiment, an elastic member 41 and a damper holder 42 are interposed between a bag holder 21 of the airbag apparatus 20 and each horn switch mechanism 30. A damping structure for suppressing, i.e., damping a vibration of the steering wheel 10 is constituted by the airbag apparatus 20, the horn switch mechanism 30, the elastic members 41, the damper holders 42, the core metal 12 and the like.

Next, each of components constituting the damping structure will be described.

<Airbag Apparatus 20>

Figure 3:
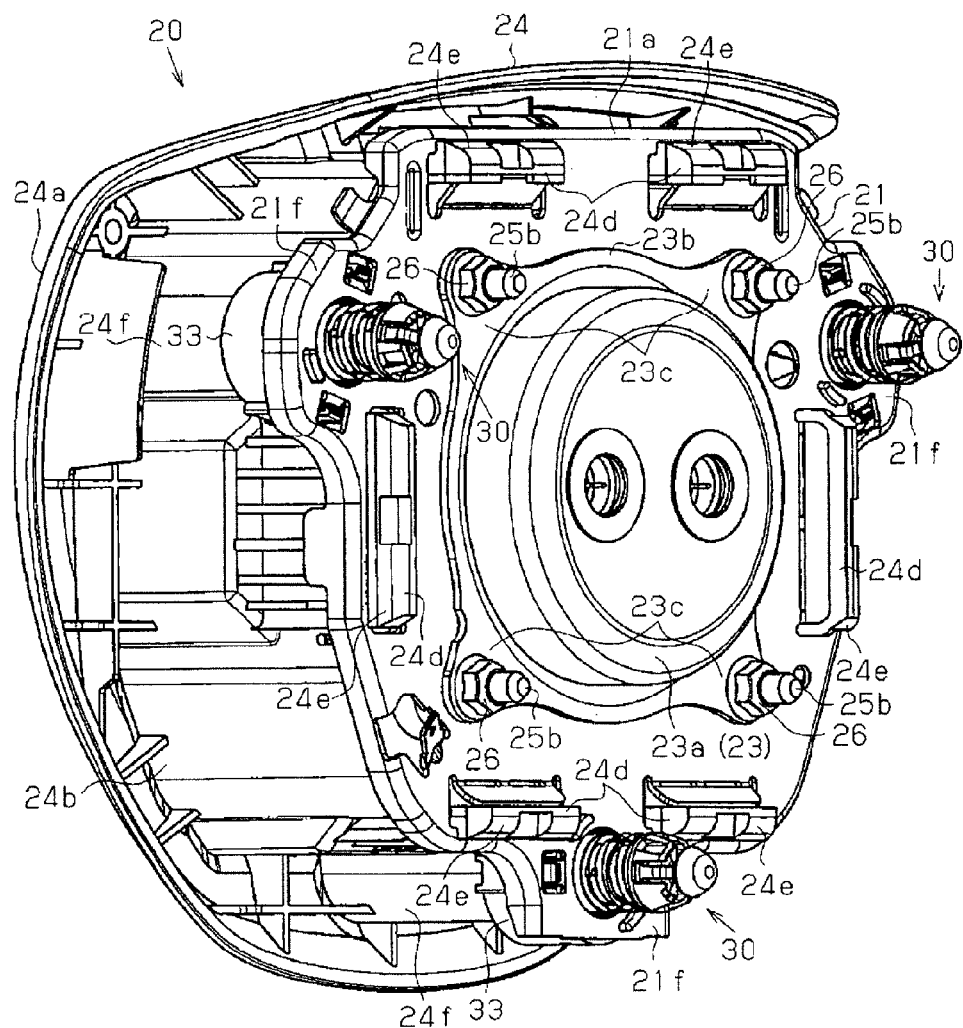
FIG. 3 is a perspective view showing an airbag apparatus according to the embodiment.

As shown in FIGS. 3 and 4, the airbag apparatus 20 is constituted by mounting a pad portion 24, an airbag (not shown) and an inflator 23 on the bag holder 21.

The pad portion 24 is formed by resin molding and includes an outer covering portion 24a having a surface serving as a design surface, and a receiving wall portion 24b provided, on a back surface side (front side) of the outer covering portion 24a, to be erected in a generally quadrangle ring shape. An inner surface of the outer covering portion 24a, which is surrounded by the receiving wall portion 24b, defines together with the bag holder 21 therebetween a bag receiving space x for mostly receiving the airbag (not shown). In a section of the outer covering portion 24a, which defines the bag receiving space x, a thinned portion 24c capable of being pushed out and torn when the airbag is deployed and inflated is formed.

A plurality of locking claws 24d, of which each has a rectangular plate shape, are integrally formed with a front end of the receiving wall portion 24b. Each locking claw 24d is formed to have a predetermined length and a broad width, and on a front end of each locking claw 24d, a locking protrusion 24e is formed to protrude toward the outside (a direction away from the bag receiving space x).

Switch supporting portions 24f for supporting the horn switch mechanisms 30 are respectively formed at a plurality of locations on the pad portion 24. Each switch supporting portion 24f is integrally formed with the receiving wall portion 24b to extend from the outer covering portion 24a of the pad 24 to the back surface (front side).

The bag holder 21 is formed in a generally quadrangle shape by pressing an electrically conductive metal plate. Alternatively, the bag holder 21 may be formed by any means, such as die-casting, other than pressing. A peripheral edge of the bag holder 21 is constituted as a peripheral edge fixing portion 21a having a generally quadrangle ring shape for fixing the pad 24.

Claw locking holes 21b are respectively formed in locations on the peripheral edge fixing portion 21a, of which each is located in front of each locking claw 24d. Each claw locking hole 21b is formed in a shape of a slit elongated in a direction toward a side of the bag holder 21, to correspond to each locking claw 24d having a broad width as described above. A front end of each locking claw 24d is inserted through and locked in each claw locking hole 21b.

An inner portion relative to the peripheral edge fixing portion 21a forms a pedestal portion 21c. A circular opening 21d is formed in the center part of the pedestal portion 21c. Screw inserting holes 21e are respectively formed in a plurality of locations on the pedestal portion 21c, which are adjacent to a peripheral edge of the opening 21d. A part of the inflator 23 is inserted through and attached to the opening 21d of the pedestal portion 21c.

More specifically, the inflator 23 includes a body 23a having a low height cylinder shape, and a flange portion 23b is formed on an outer surface of the body 23a. A plurality of attaching pieces 23c are arranged on the flange portion 23b at equal intervals in a circumferential direction of the body 23a and extend outward in a radial direction of the body 23a. Screw inserting holes 23d are respectively formed in a location of each attaching piece 23c, which is located forward of each screw inserting hole 21e of the bag holder 21. A portion of the inflator 23, which is located more rearward than the flange portion 23b, is constituted as a gas injection portion 23e for injecting an inflation gas. Also, the gas injection portion 23e of the inflator 23 is inserted through the opening 21d of the bag holder 21 from the front side thereof to protrude toward the bag receiving space x. In addition, the flange portion 23b is contacted with the peripheral edge of the opening 21d, and in this state, the inflator 23 together with a ring retainer 25 is attached to the bag holder 21.

More specifically, the ring retainer 25 includes an opening 25a having the same circular shape as the opening 21d of the bag holder 21 so that the gas injection portion 23e of the inflator 23 is inserted therethrough. Also, the ring retainer 25 has attaching screws 25b at locations thereon, which each is located rearward of each screw inserting hole 21e of the bag holder 21. An opening of the airbag (not shown), which has been folded to be deployed and inflated, is disposed between the ring retainer 25 and the bag holder 21. A plurality of attaching screws 25b on the ring retainer 25 are inserted through screw inserting holes (not shown) provided on a peripheral edge portion of the opening of the airbag and also through each screw inserting holes 21e and 23d of the bag holder 21 and the inflator 23 from the rear side thereof. Also, by screwing a nut 26 onto each attaching screw 25b from the front side after such insertion, the airbag is fixed to the bag holder 21 via the ring retainer 25 and also the inflator 23 is fixed to the bag holder 21.

Figure 6:
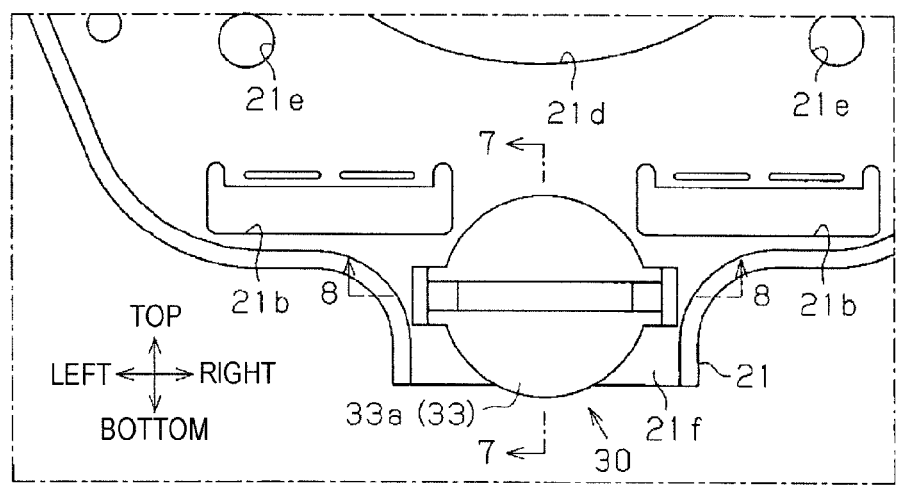
FIG. 6 is a partial front view showing a part of a bag holder having the hone switch mechanism attached thereon according to the embodiment.
Figure 8:
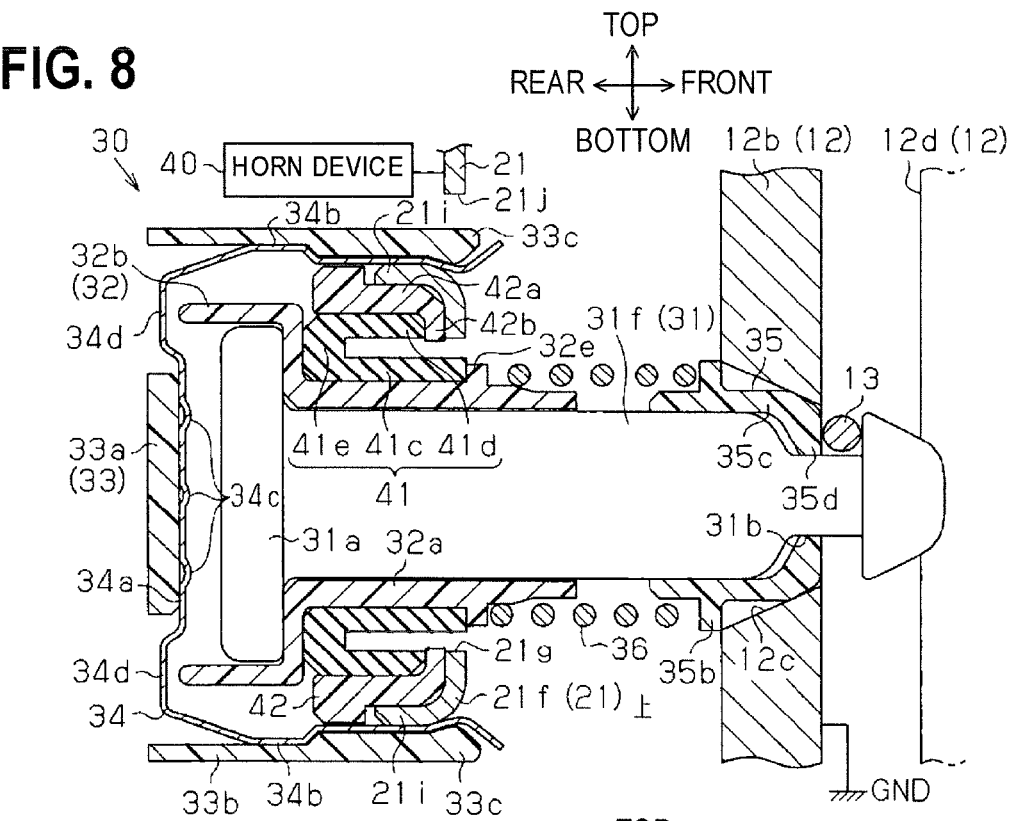
FIG. 8 is a partial sectional view showing interior structures of the hone switch mechanism and the like, as taken along a line 8-8 in FIG. 6.

At a plurality of locations on the peripheral edge fixing portion 21a of the bag holder 21, attaching portions 21f for attaching the horn switch mechanisms 30 are respectively formed to protrude outward in a radial direction of the circular opening 21d (see FIG. 6). Each attaching portion 21f is located at a location, which is located forward of the switch supporting portion 24f of the pad portion 24 as described above. As shown in FIG. 8, a circular attaching hole 21g for attaching the horn switch mechanisms 30 is formed to extend through each attaching portion 21f. In the bag holder 21, a plurality of sandwiching portions 21*i*, of which each extends rearward, are respectively integrally formed with a peripheral portion of each attaching hole 21*g*. According to the present embodiment, each sandwiching portion 21*i* is formed by rearward bending portions of the bag holder 21, which face each other with each attaching hole 21*g* interposed therebetween. Because each sandwiching portion 21*i* is formed by such bending, a hole 21*j* is formed in a portion of the bag holder 21, which is located outward relative to each sandwiching portion 21*i*, i.e., is opposite to the attaching hole 21*g* with each sandwiching portion 21*i* interposed therebetween.

<Horn Switch Mechanism 30>

The horn switch mechanism 30 is intended to operate the horn device 40 as described above, and in the present embodiment, a plurality of horn switch mechanisms are employed. Distances from each horn switch mechanism 30 to the center of the steering wheel 10 (boss portion 12*a*) are preferably set to be substantially equal to each other. The reason is to cause a contact terminal 34 and collar portion 31*a* of a snap pin 31 as described below to be securely contacted and electrically communicated with each other.

As shown in FIGS. 5A and 5B, each horn switch mechanism 30 includes the snap pin 31 as a supporting member, a pin holder 32, a contact holder 33 as a cap member, the contact terminal 34 as a movable side contact, a piece 35, and a coil spring 36 as an urging member. Each component of the horn switch mechanism 30 will be now described.

<Snap Pin 31>

The snap pin 31 is a member adapted to be supported on the core metal 12 on the front side relative to the bag holder 21 and is formed of an electrically conductive metal material. A supporting structure of the snap pin 31 on the core metal 12 will be described below. A substantial part of the snap pin 31 is constituted by a rod-shaped body 31*f* extending in the front and rear direction. The body 31*f* is formed to have a diameter slightly smaller than that of the attaching hole 21*g* of the bag holder 21. An annular locking groove 31*b* is formed in an outer circumferential surface of a front end of the body 31*f*. As shown in FIGS. 10A and 10B, the snap pin 31 has the collar portion 31*a* formed on a rear end thereof, which has a circular disk shape and serves as a fixed contact. The collar portion 31 has an outer diameter D1 larger than an inner diameter D2 of the attaching hole 21*g*. In FIG. 10B, the snap pin 31 is shown in a state where a part of the body 31*f* is omitted.

<Pin Holder 32>

As shown in FIGS. 5B and 7, the pin holder 32 is formed in a shape of a cylinder, which is opened on both front and rear ends thereof, by an insulating resin material. The pin holder 32 is disposed on an outside of the snap pin 31 and used as a slider adapted to be slid relative to the snap pin 31 in a longitudinal direction thereof (the front and rear direction) upon operation of the horn switch mechanism 30. In the pin holder 32, a rear end of a portion (hereinafter, referred to as "cylinder-shaped portion 32*a*"), through which the body 31*f* of the snap pin 31 is inserted, has a diameter slightly larger than the outer diameter of the collar portion 31*a* of the snap pin 31 and also is provided with a cylindrical enlarged-diameter portion 32*b* having an opened rear end. The collar portion 31*a* is surrounded by the enlarged diameter portion 32*b*.

On an outer circumference of a front part of the cylinder-shaped portion 32*a*, a ring-shaped protrusion 32*e* is formed over the entire periphery thereof. The ring-shaped protrusion 32*e* has a function of bearing a rear end of the coil spring 36.

<Contact Holder 33>

As shown in FIGS. 5B and 8, the contact holder 33 is formed by an insulating resin material. The contact holder 33 includes a generally circular plate-shaped top plate portion 33*a* and a generally cylindrical side wall portion 33*b* extending forward from an outer peripheral edge of the top plate portion 33*a* and is adapted to cover at least a rear end (collar portion 31*a*) of the snap pin 31 and at least a rear end (enlarged-diameter portion 32*b*) of the pin holder 32 from the rear side. On portions of the side wall portion 33*b*, which face each other in a radial direction thereof, hook portions 33*c* are formed to be elastically deformable in the radial direction.

Also, a groove 33*d* is formed on a rear part of the top plate portion 33*a* to set orientation of the contact holder 33 when the contact holder 33 is mounted on the snap pin 31 and the pin holder 32.

Claw engaging holes 33*f* are formed at a plurality of locations, which correspond to a middle part of the side wall portion 33*b* in the front and rear direction and are spaced from each other in a circumferential direction thereof (see FIG. 7). Also, arc-shaped notches 33*g* are formed at a plurality of locations, which correspond to a front part of the side wall portion 33*b* and are spaced from each other in the circumferential direction.

<Contact Terminal 34>

The contact terminal 34 is formed by pressing a band-shaped metal plate, which has electrical conductivity and is harder than the pin holder 32. The contact terminal 34 is disposed between the contact holder 33 and the pin holder 32. The contact holder 34 includes a body 34*a* extending in a radial direction of the contact holder 33 and a pair of lateral portions 34*b* extending forward from both ends of the body 34*a*.

On two locations in the body 34*a*, which are located rearward of the cylindrical enlarged-diameter portion 32*b*, i.e., on both side parts of the body 34*a* in a longitudinal direction thereof, spacing portions 34*d* are provided. Each spacing portion 34*d* is intended to space the body 34*a* from the enlarged-diameter portion 32*b* in the front and rear direction. According to the present embodiment, the spacing portions 34*d* are formed over the entire width of the body 34*a* by rearward bending a longitudinal region of the body 34*a*, including the locations. Each spacing portion 34*d* is spaced rearward from a rear end surface of the enlarged-diameter portion 32*b*. Both side parts of each spacing portion 34*d* in the longitudinal direction of the body 34*a* are also spaced from the enlarged-diameter portion 32*b*.

On a part of the body 34*a*, which is disposed between both spacing portions 34*d*, a plurality of contact protrusions 34*c* protruding forward are formed at equal intervals along the longitudinal direction of the body 34*a*. Most of a part of the body 34*a*, which excludes the spacing portions 34*d* and the contact protrusions 34*c*, is in contact with a front surface of the top plate portion 33*a* of the contact holder 33. Each spacing portion 34*d* is located more rearward than the front surface of the top plate portion 33*a*. Each contact protrusion 34*c* is located on the most front side of the body 34*a*.

Each lateral portion 34*b* is engaged by and in contact with an inside wall surface of the side wall portion 33*b* of the contact holder 33. Because each lateral portion 34*b* is engaged by the side wall portion 33*b*, the contact terminal 34 is positioned to and mounted on the contact holder 33.

Also, the enlarged-diameter portion 32*b* of the pin holder 32 is interposed between each lateral portion 34*b* and the collar portion 31 of the snap pine 31, thereby ensuring an insulation state between each lateral portion 34*b* and the collar portion 31*a*. In addition, the cylinder-shaped portion 32*a* of the pin holder 32, the elastic member 41 and the damper holder 42 are interposed between each lateral portion 34b and the body 31f of the snap pin 31, thereby ensuring an insulation state between each lateral portion 34b and the body 31f.

<Piece 35>

As shown in FIGS. 7 and 10B, the piece 35 is formed of an insulating resin material. A part of the piece 35 is constituted by a ring-shaped portion 35b having an annular shape. An outer diameter of the ring-shaped portion 35b is set to be approximately equal to an outer diameter of the coil spring 36 and an outer diameter of a rear end of the inside wall surface of the through-hole 12c, i.e., the largest diameter of the tapered inside wall surface.

Locking pieces 35c extend forward from a plurality of locations which are arranged on a front surface of the ring-shaped portion 35b along a circumferential direction thereof. On a front end of each locking piece 35c, a claw portion 35d is provided to protrude radially inward. Also, a plurality of engaging pieces 35e are provided on a front surface of the ring-shaped portion 35b to extend forward from between the locking pieces 35c adjacent in the circumferential direction. An outer surface of each engaging piece 35e constitutes a part of a tapered surface, of which diameter is increased as it goes toward the rear side.

A pair of mounting portions 35f extend rearward from the ring-shaped portion 35b. Each mounting portion 35f is curved to be swelled outward in a radial direction of the ring-shaped portion 35b, corresponding to an exterior shape of the body 31f of the snap pin 31.

The piece 35 is non-detachably mounted on the snap pin 31 because the ring-shaped portion 35b and both mounting portions 35f are fitted onto the outside of the body 31f of the snap pin 31 and also each claw portion 35d is inserted into the locking groove 31b. As described above, the piece 35 is configured so that the outer surfaces of the plurality of engaging pieces 35e are intermittently arranged in a circumferential direction thereof with the outer surfaces of the plurality of locking pieces 35c interposed therebetween. Due to this configuration, the piece 35 has generally a shape similar to that having a tapered outer surface, of which diameter is increased as it goes toward the rear side.

<Coil Spring 36>

The coil spring 36 is wound around the body 31f of the snap pin 31. The coil spring 36 is arranged in a compressed state between the ring-shaped protrusion 32e of the pin holder 32 and the ring-shaped portion 35b of the piece 35.

By doing so, a plurality of single body components, i.e., the snap pin 31, the pine holder 32, the contact holder 33, the contact terminal 34, the coil spring 36 and the piece 35 are unitized, thereby constituting the horn switch mechanism 30 embodied as an assembly. Therefore, upon attaching or exchanging of the horn switch mechanism 30, the unitized horn switch mechanism 30 can be handled as a single assembly.

<Elastic Member 41>

As shown in FIGS. 8 and 10B, the elastic member 41 is formed of an elastic material, such as rubber (e.g., EPDM, silicone rubber, or the like) or elastomer. The elastic member 41 includes an inner cylinder portion 41c, an outer cylinder portion 41d and a connection portion 41e. The inner cylinder portion 41c has a cylindrical shape extending in the front and rear direction, and is mounted on an outer side of a part of the cylinder-shaped portion 32, which is sandwiched between the ring-shaped protrusion 32e and the enlarged-diameter portion 32b. The outer cylinder portion 41d has an inner diameter larger than the inner cylinder portion 41c and also is of a cylindrical shape extending in the front and rear direction. The outer cylinder portion 41d is coaxially arranged with the inner cylinder portion 41c, and surrounds the inner cylinder portion 41c. The connection portion 41e has an annular shape and connects a rear end of the inner cylinder portion 41c with a rear end of the outer cylinder portion 41d.

The elastic member 41 together with the airbag apparatus 20 as described above constitutes a dynamic damper. According to the present embodiment, the elastic member 41 serves as a spring for the dynamic damper, and the airbag apparatus 20 servers as a damper mass.

In this case, by tuning a size of the elastic member 41, a thickness thereof in a radial direction, a length thereof in a front and rear direction or the like, a resonant frequency of the dynamic damper with respect to an upward and downward direction or a left and right direction thereof can be set at a target frequency to be damped, in other words, a frequency desired to be damped, with respect to a vibration of the steering wheel 10 in the upward and downward direction or the left and right direction thereof.

<Damper Holder 42>

As shown in FIGS. 10A and 10B, before the horn switch mechanism 30 is attached to the bag holder 21, the damper holder 42 is locked by the horn switch mechanism 30, thereby keeping the elastic member 41 mounted on the outside of the cylinder-shaped portion 32a of the pin holder 32. Also, as shown in FIG. 8, the damper holder 42 is disposed between the elastic member 41 and the bag holder 21 when the horn switch mechanism 30 has been attached to the bag holder 21.

As shown in FIG. 10B, a main part of the damper holder 42 is constituted of a side wall portion 42a and a front wall portion 42b, which are all formed of an insulating resin material. The side wall portion 42a is formed in a generally cylindrical shape and is arranged on an outer side in a radial direction of the outer cylinder portion 41d and also on an inner side in a radial direction of the sandwiching portion 21i of the bag holder 21. The front wall portion 42b is formed in a generally annular shape and is arranged forward of the outer cylinder portion 41d and also rearward of the attaching portion 21f of the bag holder 21 (see FIG. 8).

As shown in FIGS. 5A, 5B and 7, engaging claws 42d are respectively formed at a plurality of locations on the side wall portion 42a, which are spaced from each other in a circumferential direction thereof. The engaging claws 42d are engaged with the claw engaging holes 33f of the contact holder 33 from the inner side, so that the damper holder 42 is locked in the contact holder 33.

Stoppers 42e are respectively formed at a plurality of locations, which correspond to a front end of the side wall portion 42a and are spaced from each other in a circumferential direction thereof. The stoppers 42e are engaged with the notches 33g of the contact holder 33, thereby positioning the damper holder 42 with respect to the contact holder 33 in a front and rear direction thereof.

However, as shown in FIG. 8, when each horn switch mechanism 30 has been attached to the bag holder 21 through the elastic member 41 and the damper holder 42 as described above, the elastic member 41 is sandwiched, on front and rear sides thereof, between the attaching portion 21f of the bag holder 21 and the enlarged-diameter portion 32b of the pin holder 32. Also, the elastic member 41 is sandwiched, on outer and inner sides in the radial direction thereof, between the sandwiching portion 21i of the bag holder 21 and the cylinder-shaped portion 32a of the pin holder 32. Therefore, a movement of the elastic member 41 in the front and rear direction thereof is limited by the attaching portion 21f and the enlarged-diameter portion 32b. In addition, a movement of the elastic member 41 in the radial direction thereof is limited by the sandwiching portion 21i and the cylinder-shaped portion 32a.

Also, the pin holder 32 is disposed between the snap pin 31 and the bag holder 21, thereby to support the bag holder 21 to be movable relative to the snap pin 31 in the front and rear direction thereof while preventing contact between both, i.e., electrically insulting between both, and also to transfer an urging force, which is directed toward the rear side of the coil spring 36, to the collar portion 31a of the snap pin 31.

Also, the top plate portion 33a of the contact holder 33 is contacted with the switch supporting portion 24f of the pad portion 24 as described above (see FIG. 3). Therefore, for example, when the airbag apparatus 20 is hit hard, a reaction force thereof can be borne by the switch supporting portion 24f, thereby preventing the contact holder 33 from being excessively moved rearward.

Further, both sandwiching portions 21i are inserted in gaps between the side wall portion 42a of the damper holder 42 and the lateral portions 34b of the contact terminal 34. Also, the lateral portions 34b are contacted with an outer surface of the sandwiching portions 21i by each hook portion 33c of the contact holder 33. Due to such contact, the bag holder 21 can be electrically communicated with the contact terminal 34.

In addition, front ends of the lateral portions 34b urged by the hook portions 33c are locked in front of the sandwiching portions 21i. Due to the lateral portions 34b, the contact holder 33 and thus the horn switch mechanism 30 are prevented from being moved rearward from the bag holder 21.

Next, procedures of mounting the airbag apparatus 20 on the core metal 12 through the plurality of horn switch mechanism 30 will be described.

Upon such an operation, the snap pin 31 of each horn switch mechanism 30 is inserted into the through-hole 12c of the respective retainer portion 12b of the core metal 12 from the rear side thereof. Due to such insertion, the ring-shaped portion 35b of the piece 35 is approached to the retainer portion 12b so that the engaging pieces 35e are approached to the inside wall surface of the through-hole 12c. Also, a front end 31c of the body 31f in the snap pin 31 is contacted with the clip 13. When the snap pin 31 and the like are moved forward against an urging force of the clip 13, the clip 13 is elastically deformed outward in the radial direction of the snap pin 31. In addition, when the snap pin 31 is moved to a location where the locking groove 31b is opposed to the clip 13, the clip 13 attempts to enter the locking groove 31b by an elastic restoring force of its own.

Meanwhile, the claw portion 35d of the piece 35 urged forward by the coil spring 36 has already entered the locking groove 31b. Therefore, as shown in FIG. 7, the clip 13 enters between the claw portion 35d and the locking groove 31b while compressing the coil spring 36 rearward during a procedure of entering the locking groove 31b. Due to such entering, the claw portion 35d inside the locking groove 31b is located rearward of the clip 13. A part of the clip 13, which is located forward of the through-hole 12c, is sandwiched, on front and rear sides thereof, between the claw portion 35d urged forward by the coil spring 36 and a front wall surface 31d of the locking groove 31b, and thus a movement thereof is limited. In addition, the snap pin 13 is limited in movement in the front and rear direction by the clip 13 entered the locking groove 31b. In this way, the snap pin 31 is locked on the core metal 12 by the clip 13, thereby achieving fastening of each horn switch mechanism 30 to the core metal 12 and mounting of the airbag apparatus 20 on the core metal 12. Such a structure in which, as the snap pin 31 is inserted, the snap pin 31 is locked on the core metal 12 by elasticity of the clip 13 are also referred to as a snap fit structure.

In such a mounted state, the outer surface of each engaging piece 35e is in contact with the inside wall surface of the through-hole 12c. Also, the claw portion 35d is spaced slightly forward from a rear wall surface 31e of the locking groove 31b. By doing so, the piece 35 is interposed between the inside wall surface of the through-hole 12c and the snap pin 31.

Also, in the mounted state, the snap pin 31 of each horn switch mechanism 30 locked on the core metal 12 supports the bag holder 21 of the airbag apparatus 20 via the pin holder 32, so that the bag holder 21 can be advanced or retreated relative to the core metal 12, i.e., moved toward or apart from the core metal 12.

At this time, the coil spring 36 interposed between the ring-shaped protrusion 32e of the pin holder 32 and the ring-shaped portion 35b of the piece 35 is in a more compressed state than that before being attached to the core metal 12. This compressed coil spring 36 urges the pin holder 32 rearward, i.e., in a direction away from the core metal 12, so that the contact protrusions 34c of the contact terminal 34 is spaced rearward from the collar portion 31a of the snap pin 31.

The coil spring 36 allows the airbag apparatus 20 to move toward the core metal 12 as the coil spring 36 is further compressed. In other words, the coil spring 36 has been compressed in a state of ensuring a horn stroke. The term horn stroke means an amount of movement of the airbag apparatus 20 toward the core metal 12, which is required to switch a state, where the contact protrusions 34c are spaced from the collar portion 31a (off state of the horn switch mechanism 30: see FIG. 8), to a state, where the contact protrusions 34c are contacted with the collar portion 31a (on state of the horn switch mechanism 30: see FIG. 9). Also, the coil spring 36 determines a horn load, which means a load when a driver presses the airbag apparatus 20 to switch on each horn switch mechanism 30.

Hereinafter, operations of the steering wheel of the present embodiment configured as described above will be described.

When the airbag apparatus 20 is not pressed down, as shown in FIG. 8, the contact protrusions 34c of the contact terminal 34 is located rearward apart from the collar portion 31a serving as a fixed contact in the snap pin 31. Thus, because electrical communication between the contact terminal 34 and the snap pin 31 is interrupted, the horn device 40 is not activated. At this time, an urging force toward the rear side of the coil spring 36 is exerted via the pin holder 32 onto the collar portion 31a of the snap pin 31 locked on the core metal 12 by the clip 13.

Also, as shown in FIG. 7, an urging force toward the front side of the coil spring 36 is exerted onto the piece 35 via the ring-shaped portion 35b, and thus the claw 35d of the piece 35, which has entered the locking groove 31b of the snap pin 31, presses the clip 13 inside the locking groove 31b forward. Due to such pressing, the clip 13 is sandwiched, on front and rear sides thereof, between the front wall surface 31d in the locking groove 31b and the claw portion 35d and thus a movement thereof is limited.

In addition, as shown in FIGS. 7 and 8, the pin holder 32 is interposed between the snap pin 31 and the lateral portions 34b of the contact terminal 34, thereby electrically insulating between both. Also, the spacing portions 34d of the contact terminal 34 provided at locations, which are located rearward the enlarged-diameter portion 32b of the pin holder 32, are spaced from the rear end surface of the enlarged-diameter portion 32b. The top plate portion 33a of the contact holder 33 is in contact with the rear end surface of the enlarged-diameter portion 32b in a region, which is located rearward of the enlarged-diameter portion 32b but not rearward of the body 34a of the contact terminal 34. At this time, because the body 34a has a band shape, a region which is located rearward of the enlarged-diameter portion 32b and also rearward of the body 34a of the contact terminal 34 is not large. Therefore, the top plate portion 33a is in contact with a substantial portion of the rear end surface of the enlarged-diameter portion 32b.

Contrary, when the airbag apparatus 20 is pressed down, a force exerted on the airbag apparatus 20 is transferred to the contact terminal 34 and the enlarged-diameter portion 32b of the pin holder 32 via the top plate portion 33a of the contact holder 33 of at least one horn switch mechanism 30. Thus, the enlarged-diameter portion 32b is pressed by the top plate portion 33, and the pin holder 32 is slid forward along the body 31f of the snap pin 31 against the coil spring 36. As described above, because the top plate portion 33a is in contact with a substantial portion of the rear end surface of the enlarged-diameter portion 32b, the force exerted on the airbag apparatus 20 by such pressing is transferred to the pin holder 32 through a large area of the rear end surface of the enlarged-diameter portion 32b. In addition, the contact terminal 34 is moved forward, together with the top plate portion 33a.

Figure 9:
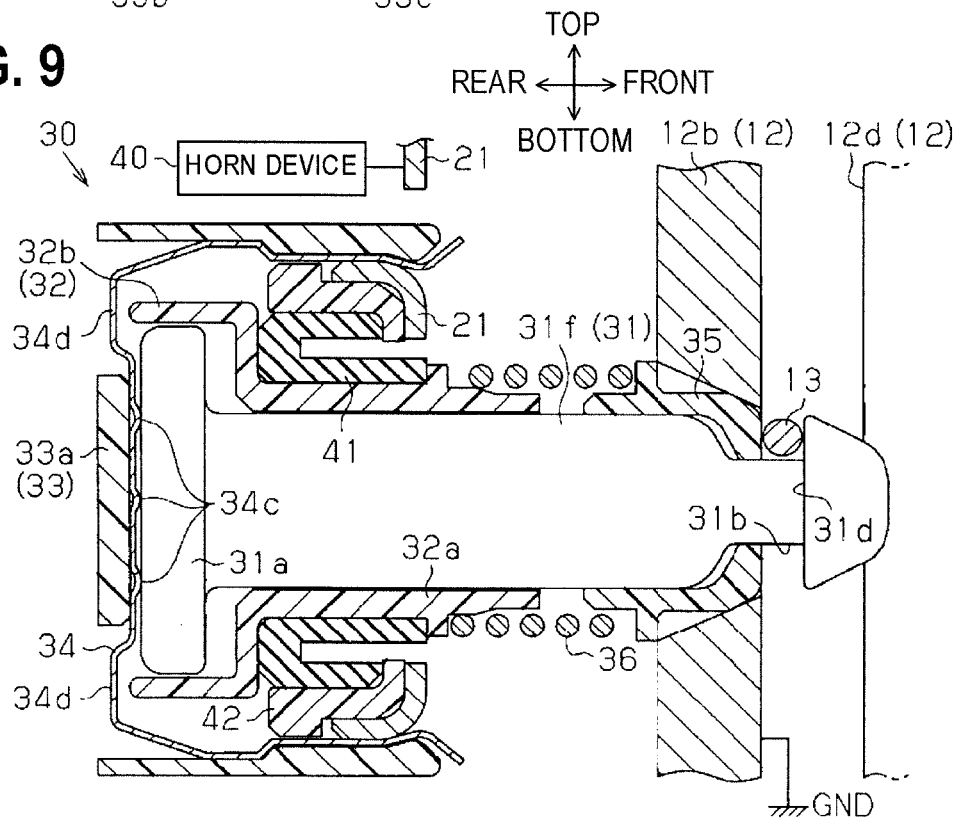
FIG. 9 is a partial sectional view showing interior structures of the hone switch mechanism and the like when the airbag apparatus is depressed from a state as shown in FIG. 8 so that a contact terminal is contacted with a pin holder.
Figure 10:
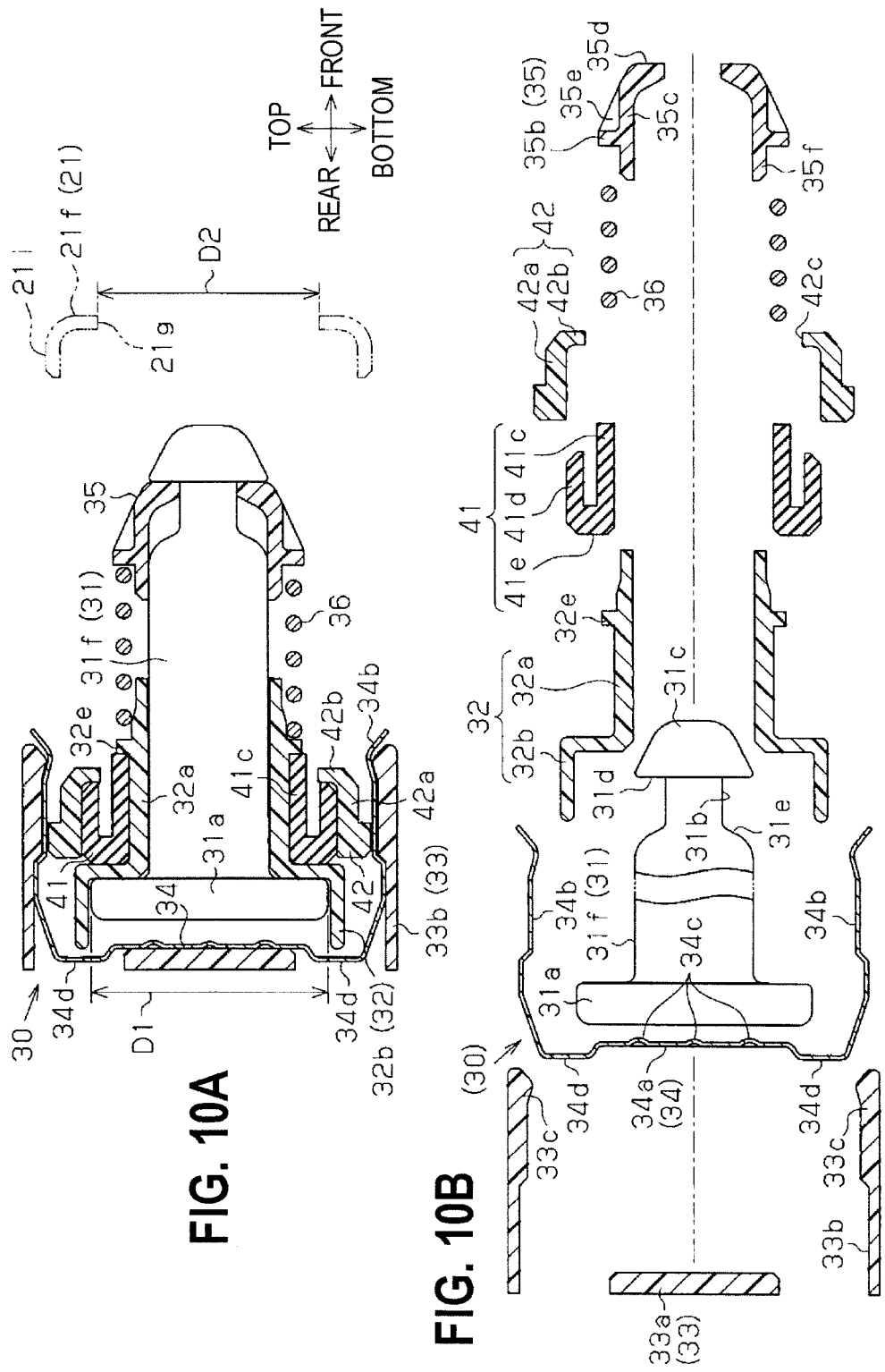
FIG. 10A is a sectional view showing the horn switch mechanism and the like according to the embodiment and FIG. 10B is an exploded sectional view of FIG. 10A.

Then, when at least one of the plurality of contact protrusions 34c of the contact terminal 34 is contacted with the collar portion 31a of the snap pin 31 as shown in FIG. 9, the core metal 12, which is connected to a ground GND (vehicle body earth), and the bag holder 21 are electrically communicated with each other via the clip 13, the snap pin 31 and the contact terminal 34. Due to such electrical communication, the horn switch mechanism 30 is closed and as a result, the horn device 40 electrically connected to the bag holder 21 is activated.

Meanwhile, at this time, both spacing portions 34d of the contact terminal 34 are spaced from the rear end surface of the enlarged-diameter portion 32d, similarly to while the horn device 40 is not activated as described above.

Thus, the enlarged-diameter portion 32b is spaced forward from the contact terminal 34, regardless of whether or not the horn device 40 is activated. Therefore, because the pin holder 32 made of resin is not brushed against the contact terminal 34 made of metal, there is hardly a phenomenon that a part of the pin holder 32, which would otherwise be contacted with the contact terminal 34, is cut to generate resin powders. In addition, the top plate portion 33a of the contact holder 33 contacted with the enlarged-diameter portion 32b is formed of resin, similarly to the enlarged-diameter portion 32b. Therefore, there is also hardly a phenomenon that contact parts between the enlarged-diameter portion 32b and the top plate portion 33a are cut to generate resin powders.

In addition, if the bag holder 21 is moved forward as described above, the urging force toward the rear side of the coil spring, which has been exerted onto the collar portion 31a of the snap pin 31 via the pin holder 32 until that time, is disappeared. Therefore, the snap pin 31 becomes a state of being capable of oscillating about a part thereof locked on the core metal 12 by the clip 13. At this time, because the urging force toward the rear side, which has also been exerted onto the clip 13 via the front wall surface 31d in the locking groove 31b until that time, is no longer exerted on the clip 13, the clip 13 becomes a state of being movable inside the locking groove 31b.

Meanwhile, in the airbag apparatus 20, no gas is injected from the gas injection portion 23e of the inflator 23 during a normal state where an impact from the front side of a vehicle due to front collision or the like is not exerted thereon, and thus the airbag is kept folded.

Although being in such a normal state, there is a case where, during high speed driving of the vehicle or idling of an in-vehicle engine, a vibration in an upward and downward direction or a left and right direction are exerted to the steering wheel 10. Such a vibration is exerted onto the airbag apparatus 20 via the core metal 12, each horn switch mechanism 30, each elastic member 41 and each damper holder 42.

According to the vibration, the airbag apparatus 20 serves as a damper mass of a dynamic damper and each elastic member 41 serves as a spring of the dynamic damper.

For example, if the steering wheel 10 is vibrated at a certain frequency in the upward and downward direction, each elastic member 41, together with the airbag apparatus 20, is vibrated (resonated) in the upward and downward direction at a resonant frequency equal to or near the frequency while being elastically deformed, so that vibration energy of the steering wheel 10 in the upward and downward direction can be absorbed. Due to such absorption, a vibration of the steering wheel 10 in the upward and downward direction can be suppressed.

In addition, if the steering wheel is vibrated at a certain frequency in the left and right direction, each elastic member 41, together with the airbag apparatus 20, is vibrated in the left and right direction at a resonant frequency equal to or near the frequency while being elastically deformed, so that vibration energy of the steering wheel 10 in the left and right direction can be absorbed. Due to such absorption, a vibration of the steering wheel 10 in the left and right direction can be damped.

In this way, according to the present embodiment, a vibration of the steering wheel 10 with respect to any of the upward and downward direction and the left and right direction can be damped (suppressed).

A space of the elastic member 41, which is located between the inner cylinder portion 41c and the outer cylinder portion 41d and also more forward than the connection portion 41e, allows the elastic member 41 to be easily deformed. Therefore, when the steering wheel 10 is vibrated, it is easy for the elastic member 41 to be resonated together with the airbag apparatus 20.

However, when an impact from the front side of a vehicle due to front collision or the like is exerted thereon, a driver tends to be leaned forward due to inertia. Then, in the airbag apparatus 20, the inflator 23 is activated depending upon such an impact, thereby injecting a gas from the gas injection portion 23e. As the gas is supplied to the airbag, the airbag is deployed and inflated. If a pressing force exerted on the outer covering portion 24a of the pad portion 24 is increased due to the airbag, the outer covering portion 24a is broken at the thinned portion 24c. The airbag continues to be deployed and inflated rearward through an opening generated by such breakage. The deployed and inflated airbag is interposed in front of the driver to be leaned forward by an impact of front collision, thereby restraining the forward leaning of the driver and thus protecting the driver from such an impact.

When the airbag is deployed and inflated rearward, a force is exerted onto the bag holder 21 toward the rear side thereof. In this regard, according to the present embodiment, the snap pin 31 of each horn switch mechanism 30 is supported by the retainer portion 12b of the core metal 12. The collar portion 31a formed on the rear end of each snap pin 31 is located more rearward than the attaching hole 21g of the bag holder 21. The collar portion 31a has the outer diameter D1 larger than the inner diameter D2 of the attaching hole 21g (see FIG. 10A). Therefore, when the bag holder 21 is moved rearward, the collar portion 31a is contacted with a peripheral portion of the attaching hole 21g in the bag holder 21, thereby serving as a stopper and thus preventing the bag holder 21 from being further moved rearward.

According to the present embodiment described in detail above, the following effects are achieved.

(1) On locations in the body 34a of the contact terminal 34, which are located rearward of the enlarged-diameter portion 32b constituting the rear end of the pin holder 32 (slider), the spacing portions 34d for spacing the body 34a from the enlarged-diameter portion 32b are provided (see FIG. 8).

Therefore, the enlarged-diameter portion 32b can be spaced from the body 34a, regardless of whether or not the horn device 40 is activated. There is hardly a phenomenon that as the enlarged-diameter portion 32b made of resin is brushed against the body 34a made of metal, a part of the enlarged-diameter portion 32b contacted with the body 34a is cut to generate resin powders. As a result, it can be prevented that resin powders are accumulated and thus an insulating layer is formed between the contact terminal 34 and the collar portion 31a of the snap pin 31, thereby keeping a good electrical communication between the contact terminal 34 and the snap pin 31 when the airbag apparatus 20 is pressed down.

(2) The contact terminal 34 is formed of a plate material, and a region of the body 34a thereof, which is located rearward of the enlarged-diameter portion 32b of the pin holder 32, is bent rearward (see FIG. 10B).

Therefore, in such a region of the body 34a, the spacing portions 34d spaced from the rear end surface of the enlarged-diameter portion 32b can be formed. By using as a movable side contact the contact terminal 34 having such spacing portions 34d, the body 34a can be spaced from the enlarged-diameter portion 32b, thereby achieving the effect of the above (1).

Also, even if the pin holder 32 is rotated in a circumferential direction, the enlarged-diameter portion 32b is hardly brushed against the contact terminal 34 because the spacing portions 34d are located in the region rearward of the enlarged-diameter portion 32b. Therefore, it is not necessary to separately provide a means for preventing rotation of the pin holder 32.

(3) As the snap pin 32 (supporting member), those having the collar portion 31a on a rear end thereof is employed.

A rear end of the pin holder 32 (slider) is constituted by the cylindrical enlarged-diameter portion 32b, and the collar portion 31a is surrounded by the enlarged-diameter portion 32b. A part of the contact terminal 34 is constituted by the band-shaped body 34a, which extends in a radial direction of the top plate portion 33a of the contact holder 33 and has the spacing portions 34d formed at two locations, which are located rearward of the enlarged-diameter portion 32b (see FIG. 8).

Therefore, the enlarged-diameter portion 32 can be interposed between the collar portion 31a and the lateral portions 34b of the contact terminal 34, thereby electrically insulating between both.

Also, the top plate portion 33a of the contact holder 33 can be in contact with a substantial portion of the rear end surface of the enlarged-diameter portion 32b. As a result, when the airbag apparatus 20 is pressed down, a force exerted on the airbag apparatus 20 can be transferred to the pin holder 32 through a large area of the rear end surface of the enlarged-diameter portion 32b, thereby sliding the pin holder 32 forward.

(4) The ring-shaped elastic member 41 is disposed between the pin holder 32 and the bag holder 21 of the airbag apparatus 20 (see FIG. 8).

Therefore, the airbag apparatus 20 can serve as a damper mass of a dynamic damper and the elastic member 41 can serve as a spring of the dynamic damper, thereby suppressing a vibration of the steering wheel 10.

Meanwhile, the foregoing embodiment may be modified as in the following variants.

<Snap Pin 31 and Pin Holder 32>

The shape of the collar portion 32a of the snap pin 31 may be modified to a non-circular plate shape. In this case, the enlarged-diameter portion 32b of the pin holder 32 may be modified to any shape for covering the collar portion 31a on a condition of having a shape of a cylinder opened on a rear end thereof.

<Spacing Portion>

As shown in FIG. 11, the spacing portions may be provided on the enlarged-diameter portion 32b constituting the rear end of the pin holder 32, instead of the contact terminal 34. In this case, a recessed portion opened on a rear surface is provided at a region of the enlarged-diameter portion 32b, which is located forward of the contact terminal 34, and a wall surface of the recessed portion constitutes a spacing portion 32c.

However, if the pin holder 32 is rotated in a circumferential direction and thus a position relationship between the enlarged-diameter portion 32b and the contact terminal 34 in the circumferential direction is changed, there is a possibility that the enlarged-diameter portion 32b is brushed against the contact terminal 34. Therefore, to prevent such a phenomenon, it is necessary to separately provide a means for preventing rotation of the pin holder 32.

In addition, the spacing portions may be provided on the enlarged-diameter portion 32b of the pin holder 32 as well as the contact terminal 34, i.e., both of the contact terminal 34 and the enlarged-diameter portion 32b. In this case, a region of the body 34a of the contact terminal 34, which is located rearward of the enlarged-diameter portion 32b, are bent rearward, and also a recessed portion is provided in a regain of the enlarged-diameter portion 32b, which is located forward of the contact terminal 34. The bent region of the body 34a and the recessed portion of the enlarged-diameter portion 32b constitute the spacing portions.

Even if the spacing portions are modified to any of aspects as described above, because the contact terminal 34 and the enlarged-diameter portion 32b are spaced from each other, there is hardly a phenomenon that as the enlarged-diameter portion 32b made of resin is brushed against the body 34a made of metal, a part of the enlarged-diameter portion 32b contacted with the body 34a is cut to generate resin powders.

<Elastic Member 41>

As the elastic member 41, those other than the foregoing embodiment may be employed. For example, the connection portion 41e may be provided on such a region that the a middle part of the inner cylinder portion 41c and a middle portion of the outer cylinder portion 41d are connected to each other.

<Others>

The damping structure as described above may be applied to a steering wheel of a steering apparatus of conveyances other than vehicles, such as aircrafts or ships.

Additionally, technical spirits which can be understood from each of the foregoing embodiments will described below, together with effects thereof.

(A) The steering wheel according to any one of the configurations (1) to (4), wherein the airbag apparatus includes a bag holder formed of an electrically conductive material and having an attaching hole;

wherein the supporting member is inserted through the attaching hole and supported by the core metal, and the slider arranged outside the supporting member is inserted through the attaching hole; and wherein the movable side contact is electrically connected to the horn device via the bag holder.

According to the above configuration (A), when the airbag apparatus is pressed down, the slider is pressed by the cap member and thus the slider is slid forward against the urging member. Also, when the movable side contact, together with the cap member, is moved forward and contacted with the supporting member, the core metal and the bag holder are electrically communicated with each other via the supporting member and the movable side contact. Due to such electrical communication, the horn switch mechanism is closed and thus the horn device electrically connected to the bag holder is activated.

What is claimed is:

1. A steering wheel having an airbag apparatus mounted on a core metal via a horn switch mechanism for activating a horn device, the horn switch mechanism comprising:
    a supporting member that is formed of an electrically conductive material, supported on the core metal, and extends rearward;
    a slider that is formed of an insulating resin material, is disposed outside the supporting member to be slidable with respect to the supporting member, and urged rearward by an urging member;
    a cap member that is formed of an insulating resin material and covers at least a rear end of each of the supporting member and the slider; and
    a movable side contact that is formed of an electrically conductive metal material and disposed between the cap member and the slider;
    wherein the horn switch mechanism is configured to activate the horn device by transferring a force which is exerted onto the airbag apparatus when the airbag apparatus is pressed down to the movable side contact and the slider via the cap member, sliding the slider forward against the urging member, and moving the movable side contact forward to be contacted with the supporting member, and
    wherein on at least one of a region of the movable side contact located rearward of a rear end of the slider, and a region of the rear end of the slider located forward of the movable side contact, a spacing portion for spacing the movable side contact and the rear end of the slider from each other is provided.

2. The steering wheel according to claim 1, wherein the movable side contact is formed of a plate material, and
    the spacing portion is formed by rearward bending a region of the plate material located rearward of the rear end of the slider.

3. The steering wheel according to claim 2, wherein the supporting member includes a collar portion at a rear end thereof,
    the rear end of the slider has a cylinder shape and surrounds the collar portion, and
    a part of the movable side contact is constituted by a main body having a band shape extending in a radial direction of the cap member and having the spacing portion formed in the region located rearward of the rear end of the slider.

4. The steering wheel according to claim 3, wherein the slider and the airbag apparatus are connected with each other by an elastic member disposed therebetween.

5. The steering wheel according to claim 2, wherein the slider and the airbag apparatus are connected with each other by an elastic member disposed therebetween.

6. The steering wheel according to claim 1, wherein the slider and the airbag apparatus are connected with each other by an elastic member disposed therebetween.

* * * * *